United States Patent [19]

Gyi

[11] 4,058,843
[45] Nov. 15, 1977

[54] HEAD AND GIMBAL ASSEMBLY

[75] Inventor: Ko Ko Gyi, Thousand Oaks, Calif.

[73] Assignee: Burroughs Corporation, Detroit, Mich.

[21] Appl. No.: 593,123

[22] Filed: July 3, 1975

[51] Int. Cl.² .................. G11B 5/60; G11B 17/32; G11B 21/20
[52] U.S. Cl. ..................... 360/103; 360/105
[58] Field of Search ............... 360/103, 105, 104, 109; 248/204

[56] References Cited

U.S. PATENT DOCUMENTS

| | | | |
|---|---|---|---|
| 3,310,792 | 3/1967 | Groom et al. | 360/103 |
| 3,593,326 | 7/1971 | Turner et al. | 360/103 |
| 3,593,330 | 7/1971 | Ackley | 360/103 |
| 3,668,668 | 6/1972 | Robitschek | 360/103 |
| 3,697,965 | 10/1972 | Heutten | 360/103 |
| 3,702,461 | 11/1972 | Cantwell | 360/103 |
| 3,805,290 | 4/1974 | Thompson | 360/103 |
| 3,864,749 | 2/1975 | Stansell | 360/103 |
| 3,896,495 | 7/1975 | Beecroft | 360/103 |
| 3,914,792 | 10/1975 | Beecroft | 360/103 |

Primary Examiner—Alfred H. Eddleman
Attorney, Agent, or Firm—Nathan Cass; Kevin R. Peterson; Edward J. Feeney, Jr.

[57] ABSTRACT

A magnetic transducer head adapted for flying on a fluid atmospheric bearing and a gimbal mounting device comprising a spring structure including an inner spring element secured to the head for inhibiting movement thereof in directions parallel with a plane therethrough and including an outer spring element coupled to the inner element and adapted to restrain rotation movement of the head about a pivot point thereon, the inner element being oriented in a plane coextensive with the line through the center of mass of the head and the head having a load point approximating the center of mass.

7 Claims, 3 Drawing Figures

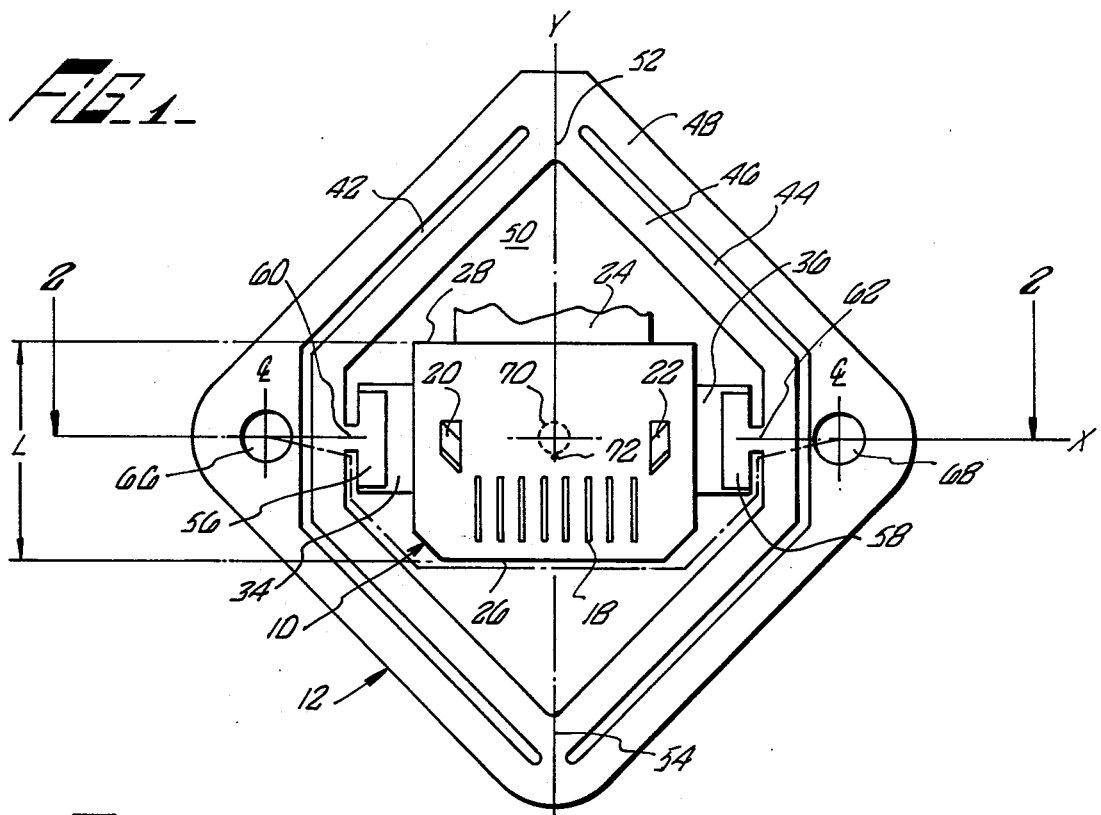
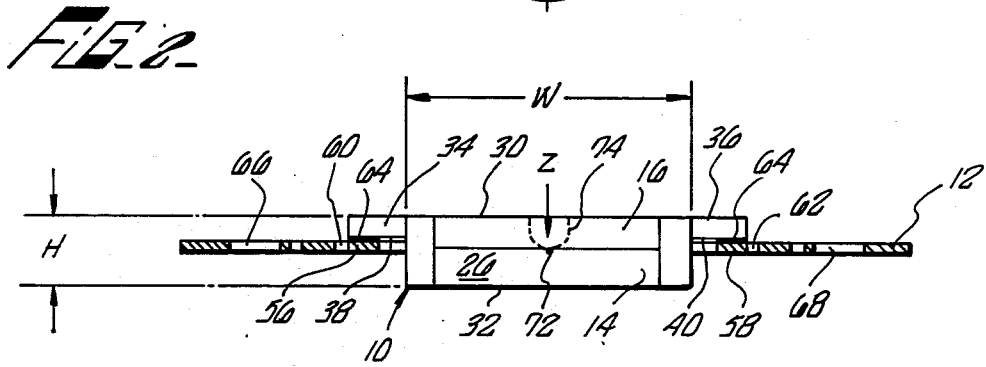
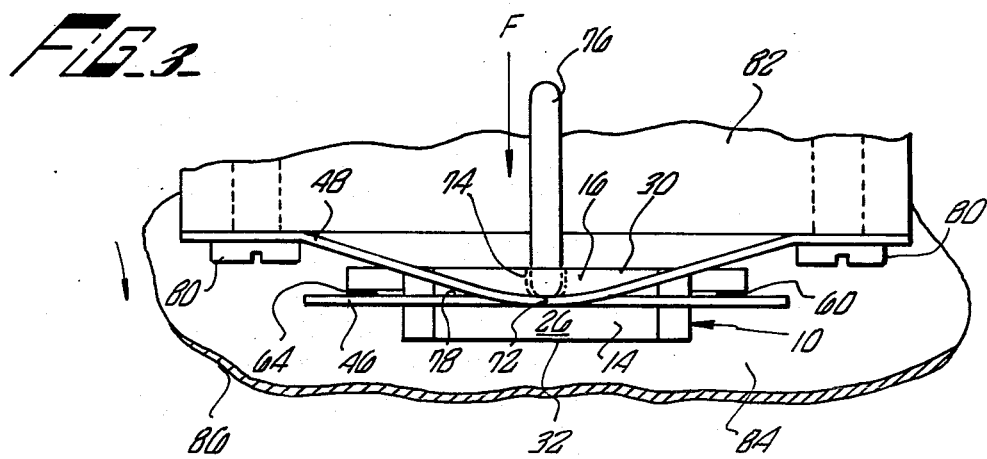

HEAD AND GIMBAL ASSEMBLY

BACKGROUND OF THE INVENTION

The present invention relates to magnetic recording heads for reading and writing on a magnetic recording surface and, more particularly, to improved mounting arrangements for such magnetic heads.

Magnetic recording heads of the type commonly used for reading and writing on magnetic recording means such as rotating magnetic recording disks and rotating magnetic recording drums, are often used for recording digital information at extremely high densities. As the density at which digital information is recorded on a magnetic recording surface is increased, the gap between the recording head and the magnetic recording surface must be decreased. The smaller the gap and the closer the magnetic head is positioned with respect to the recording surface, the more difficult it becomes to control the mechanical tolerances of the structure mounting the recording head. To overcome these mechanical difficulties, mechanical recording heads are placed in head assemblies adapted for floating on a thin film of air created by the laminar air flow due to the rotation of the recording surface.

In such systems, when the recording medium rotates, the laminar air flow causes the head assembly to be forced away from the medium. Therefore, some urging means, such as a spring, must be provided to overcome this air flow and counterbalance the head assembly, keeping it as close to the recording medium as possible.

Floating magnetic recording head assemblies are often mounted in gimbal mounting devices in order to allow the angle and position of the magnetic recording head assembly to conform to the air bearing.

Frequently, gimbals are arranged for free frictionless gimbaled action. However, a completely free moving and frictionless gimbal is undesirable for floating magnetic recording head assemblies. For example, during disk runout or with the occurrence of air turbulence as the head assembly is being moved into a floating position with respect to the magnetic recording surface, the distance between the assembly and the recording surface will vary and the head assembly may be caused to rotate and strike the recording surface thereby causing damage to the recording surface and/or the head assembly. Furthermore, the angle of a head assembly mounted in a free frictionless gimbal is unstable. As a result, as the head is moved into a recording position, it may quite possibly rotate at an angle allowing the edge or corner of the head assembly to strike the recording surface.

In order to overcome the aforementioned disadvantages, springs capable of applying increased amounts of force to the head have been used in an attempt to provide restrained movement of the assembly and to overcome undesired head yaw of the assembly as, for example, the laminar air flow increases and decreases and to enable the show of the assembly to properly float upon the nearly impenetrable barrier created upon the recording surface by the air flow. However, this arrangement is generally quite complex requiring accurately machined parts and, moreover, the increased spring force applied to the assembly causes wear on both the recording surface and the assembly and may score the surface at slow speeds while stopping and starting because the force applied by the springs is constant and usually greater than that required to break through the laminar air flow.

Other conventional type gimbal mountings for recording head assemblies are, for example, disclosed in U.S. Pat. No. 3,320,599, issued May 16, 1967 to Billawalla and U.S. Pat. No. 3,864,749, issued Feb. 4, 1975 to Stansell. The gimbal springs disclosed in these patents comprise an intricate network of either four or six elongated perforations incorporated in a rectangular body structure including a head support surface adapted to be connected to and carry the recording head assembly. The body structure further includes oppositely positioned ears for connecting the spring to a head actuator assembly. Typically, the head support surface is elongated and adapted to be secured to the non-bearing surface or back of the head, across the entire length thereof.

The disadvantage inherent in such a structure is the generally high degree of stiffness of the head support surface as compared to that of the perforated or leaf portion of the structure which gives rise to substantial movement of the head assembly in the roll direction, e.g., during positioning actuation of the head and in the presence of air turbulence intermediate the bearing surface of the head and the recording surface. Also, it has been found that such a support surface provides less rigidly in the yaw direction.

Further enhancing roll of the head assembly is the arrangement of mounting the spring support to the non-bearing surface in a plane parallel to but above the line through the center of mass. Also, in the spring arrangement under discussion, the usual actuator plunger or piston moves the head into its actuated position by way of spring, i.e., there is no direct point of actuating engagement between the piston and the load point of the head which, generally speaking, provides for poor flying stability due to the forces acting upon this point remote from the line through the center of mass of the head.

Still further, this type of gimbal spring for mounting magnetic recording heads has excessive play in the structure thereof and allows the head assembly mounted thereto to substantially rotate around an axis perpendicular to the recording surface or to move parallel relative to the recording surface. This is of great disadvantage as far as high recording densities are concerned.

SUMMARY OF THE INVENTION

In contrast, the present invention is directed to a head support device for magnetic recording heads which inhibits the aforementioned rotation of a connected magnetic recording head assembly around an axis perpendicular to the recording surface and also inhibits any movement of the head assembly in a plane parallel relative to the recording surface. Further, the support device is arranged such that when the recording head is actuated into its floating or flying position with respect to the recording surface, the head assembly approaches the surface at the same angle.

Moreover, the head support device of the invention provides substantial reduction in roll of the head assembly, e.g., during positioning actuation, and provides increased stiffness in the yaw direction as a result of an improved spring element and head connecting arrangement including means for mounting the head to the spring.

Still further, the head support device of the invention is adapted to provide improved flying stability by moving the load point and point of actuating contact between the actuating piston and recording head closer to the line through the center of mass independently from the spring element carrying the head.

The head support device constructed in accordance with the present invention is formed of a single, thin piece of deformable material which provides a spring return for normally tending to retract the head assembly from the recording surface, provides essentially gimbaled action and yet provides restrained movement and generally stiff resistance of the head in response to forces applied thereto so as to impart stability to the floating head assembly. The cost of such a head support device is significantly less than that of known prior art floating head support devices providing gimbaled action.

Accordingly, the invention provides an improved gimbal spring and head mounting arrangement which, in essence, comprises a thin, rectangular body structure of generally flexible material having a central, elongated recess therein, the structure including opposed head suspension members having inner edges defining the recess, the members having formed thereon a pair of projections or ears protruding inwardly therefrom, generally midway of the recess, the projections being secured to corresponding lateral ear portions of a recording head by a bonding agent in a line extending coplanar with the line through the center of mass of the head, the latter being positioned within the confines of the said recess such that the leading and trailing edges of the head are oriented in a plane transversely to the elongation of the recess.

The arrangement, moreover, is such that the load point thereon is at the center of the head and gimbal in both an X and a Y direction, the head being formed, at the non-bearing surface thereof, with an inwardly extending, centrally located recess extending perpendicularly to the center of mass of the head, the recess being configured to receive the actuating piston of a head actuator device. The non-offset of the load point of the piston along either the X or Y direction and its penetration into the head to a point slightly removed from the center of mass compensates for the difference in pressure caused by the difference in velocity of the recording medium, e.g., a disk, along a radial dimension thereof and provides a stable, positive approach for the head with respect to the disk as the head is being moved into a floating position. The positive approach is such that the crest of the beveled leading edge is raised to a point approximating the line through the center of mass and well above the trailing edge, causing the head to move smoothly into a floating position substantially without movement in the roll and yaw directions, preventing the leading edge of the head from striking the recording surface.

A gimbal spring and head arrangement thus constructed has been found to provide a reduction of head movement in the roll direction of about 70% as compared with conventional gimbal mountings, under the same conditions.

These and other aspects of the present invention may be more fully understood with reference to the following description of the attached drawings.

BRIEF DESCRIPTION OF THE DRAWINGS

FIG. 1 is a plan view of a magnetic recording head assembly, and associated head connector, mounted on a head support device embodying the present invention;

FIG. 2 is a section view of the arrangement of FIG. 1 taken along the lines 2—2; and FIG. 3 is a plan view of a magnetic recording head assembly mounted on the head support device of FIGS. 1 and 2 adjacent a portion of a rotating magnetic recording disk and shown with the head assembly actuated onto an air bearing formed by the disk and embodying the invention.

DESCRIPTION OF THE PREFERRED EMBODIMENT

Referring now to the drawings in which like reference numerals index like parts and with attention initially directed to FIGS. 1 and 2, there is shown a magnetic recording head assembly 10 mounted to a head support device 12. The head assembly 10 includes the usual head shoe 14 and backplate 16. The shoe contains a plurality of magnetic transducers 18 normally used for reading and writing on rotating magnetic recording media, e.g., drums and disks. In addition, a pair of magnetic position information transducers 20, 22 are provided for positioning the assembly relative to a predetermined track, not shown. A positioning system utilizing such positioning means is described in copending U.S. Pat. application Ser. No. 574,872, filed May 6, 1975, now U.S. Pat. No. 4,007,493, and assigned to the same Assignee of the present invention.

Electronic switching circuits, not shown, within the head assembly, are provided for switching the output signals of the transducers 18, 20 and 22 to the usual electrical connector, not shown, by means of a head cable 24.

The shoe and backplate assembly, typically, is made of "Fotoceram 8603" (Trademark by Corning Glass), a ceramic material having a very high temperature insensitivity and substantially high impact resistance. As shown, the shoe and backplate assembly is of generally rectangular configuration and, typically, has a width W of 0.810 inch, a length L of 0.600 inch and a thickness or height H of 0.219 inch ± 0.005 inch.

The recording head assembly defines a leading edge 26 and a trailing edge 28 and further includes a non-bearing surface 30 and a bearing surface 32, the latter resting upon an air bearing when the head assembly 12 is actuated into a floating position. The bearing surface 32 includes the usual beveled surface, not shown, formed to provide the desired flying characteristics for the head assembly when it is in a floating position on the air bearing. The bearing surface 32 is meant to refer generally to the whole surface which is adjacent to the surface of the magnetic recording medium.

The backplate 16 is formed with a pair of ears 34, 36 extending laterally outwardly from the sides thereof. The ears allow the shoe and backplate assembly to be mounted on the head support device 12 such that the device 12 is oriented along a plane coaxially with the line through the center of mass of the shoe and backplate assembly. Typically, the ears 34, 36 have a length of 0.300 inch, a width of 0.095 inch ± 0.002 inch and a thickness or height of 0.095 inch ± 0.002 inch. The support surfaces 38, 40 of the ears 34, 36 to which the support device 12 is attached, extend in parallelism with the general plane of the bearing surface 32.

The head support device 12 is a substantially flat body structure or plate and is generally known as a "gimbal" spring providing gimbaled action in order to allow the angle and position of the magnetic recording head assembly to conform to the air bearing or thin film of air caused by a moving magnetic recording surface. The support device 12 is composed of an elastic material, typically heat treated beryllium copper which will deform under an applied force but which normally returns to a flat condition when such force is removed. The body structure of the support device 12 includes a first perforation 42 and a second perforation 44 arranged so as to define an inner rectangular head support member 46 and an outer rectangular support member 48, the inner head support member 46 defining a central, generally rectangular recess 50 within the body structure of the spring. The rectangular head support member 46 is connected to the outer support member 48 by means of a pair of bridging members 52, 54. The bridging members 52, 54 are positioned at opposite points of the device 12 and at opposite longitudinal ends of the support members 46, 48 along a Y axis of the device 12.

The device 12 includes a pair of connecting members 56, 58 formed unitary with the inner head support member 46 along the inner edges thereof and at opposite points relative to each other along an X axis of the device 12. The connecting members 56, 58 are secured to the ears 34, 36 of the backplate 30. To this end, the bearing surfaces of the connecting members 56, 58 are generally rectangular in shape and of a length slightly less than that of the ears 34, 36 to provide a suitable support area for the head assembly 12. As shown, the rectangularly-shaped connecting members 56, 58 are interconnected with the inner head support member 46 by way of bridging members 60, 62. The ears 34, 36 are bonded to the bearing surfaces 58, 60 by means of an epoxy material 64.

The head support device 12 further includes a pair of apertures 66, 68 at opposite points of the spring along the X axis thereof and which allow the device 12 to be attached to a mounting structure which supports the support device and connected structure near the recording surface of a rotating magnetic recording medium.

Typically, the support device 12 has diametrically opposite ends along the X and Y axes of the device, each end defining 90° corners. The device 12 has an effective width of 0.805 inch, measured along the X axis between the center lines of the apertures 66, 68. Typically, the device 12 has a thickness of 0.0120 inch ± 0.0010 inch while the bond of epoxy material disposed between the ears 34, 36 and the connecting members 56, 58, has a thickness of 0.001 inch.

Two perpendicular dashed center lines are shown in FIG. 1 to represent the X and Y axes of the head support device 12. It will be noted that the center lines of the apertures 66, 68 are axially aligned with the short or transverse axes of the connecting members 56, 58 and ears 34, 36 along the X direction, parallel with the general planes of the leading edge 26 and trailing edge 28. It should also be noted that the load point 70 on the assembly 10 is off of center with respect to the geometric center 72 of the head in the Y-direction. Typically, the load point 70 has an orientation in a direction perpendicular to the plane of the head support device 12, intersecting the geometric center of the device 12. Preferably, a gimbal spring which, inter alia, eliminates frictionless gimbaling of the head in any direction a force is applied, comprises an elastic yet "movement restraining" structure positioned such that its own geometric center and the center of mass of the head are on the Y axis. Accordingly, the center of mass of the head assembly 10 is a point on a line through the geometric center of the spring, perpendicular to the plane of both the spring and the head structure. When coordinated with the X and Y axes, the center mass of the head assembly is oriented along a Z axis.

In the arrangements shown in FIGS. 2 and 3, the center of mass is located in the head shoe 14 along the X axis, directly below the load point 70 and is intersected by the Z axis. Typically, the plane of the head support device in the X direction extends coaxially with the line through the center of mass of the head assembly.

Provided through the backplate 16 of the head assembly 10 is an aperture 74 through which extends the usual plunger 76 of a head actuating device, not shown. The head actuating device includes means, not shown, for selectively placing the plunger 76 in either an actuated or deactuated position. In its actuated position of FIG. 3, the plunger abuttingly engages the upper surface 78 of the head shoe 14 in the Z direction at a point directly adjacent the center of mass of the head assembly. As shown in FIG. 3, the head support device 12 is connected by screws 80 to a reference structure or head actuator housing 82 which supports the support device 12 and connected head assembly 10 near a recording surface 84 or a rotating magnetic recording medium 86. In the condition shown, the bearing surface 32 rests or floats upon a thin film of air caused by the moving magnetic recording surface.

In floating or flying condition of the head and gimbal assembly, the plunger 76 engages the surface 78 of the head assembly and depresses the latter in direction toward the recording surface 84 to within a given distance thereof, this distance being predetermined by the actuator device. In depressing the head assembly, the outer rectangular support member 48 is flexed or deflected relative to the X axis to a degree proportional to the distance desired between the recording surface and the bearing surface 32 of the assembly 10. Inasmuch as the inner head support member 46 is interconnected with the outer support member 48 only at the areas encompassed by the bridging members 52, 54 in the Y direction, the inner head support member under the perpendicular force F applied thereto via the plunger 76 and head assembly 10, retains a generally uniform parallel position with the recording surface 84. As a result of the perpendicular force F applied approximate the center of mass of the head in the Z direction, normal to the geometrical center of the spring, and further due to the tension provided on the bridging members 52, 54 by the flexed outer support member 48, the inner support member 46 inhibits any movement of the head assembly parallel with the recording surface 84.

If the rotational force is applied to the head assembly 10 about the X axis, the longitudinal perforations 42, 44 in the spring structure permit practically negligible movement of the inner head support member 46 in the direction in which the force is applied. However, due to the constant tension applied onto the inner support member 46 by the outer support member 48 at the bridging portions 52, 54, the former automatically returns the head support assembly to its normal position upon removal of the rotational force.

Similarly, rotational movement of the assembly 10 about the Y direction causes the inner head support member to slightly deform in the direction this force is applied. Again, due to the tension applied to the inner head support member at the bridging portions 52, 54, the head assembly 10 returns to its normal position as such rotational force is removed.

Thus, the head support device 12 provides effective roll or yaw control of the head assembly 10 by means of applying a perpendicular force F directly onto the center of mass of the assembly 10 which causes the outer support member 48 to stress which, in turn, applies a counter force onto the inner head support member 46 allowing the latter member to retain the connected head structure 10 in a balanced horizontal position both in the X and Y direction.

It should be noted that in positioning the plane of the head support device 12 coplanarly with the line through the center of mass of the head assembly and by moving the load point on the assembly in close proximity to its center of mass, the overall flying characteristics, e.g., the flying stability of the head, are greatly improved, this in contrast to conventional gimbal mounts in which the gimbal spring typically includes a central head support plate attached to the non-bearing or back surface of the head in a plane substantially remote from the line through the center of mass and in which actuation of the head is effected indirectly, i.e., the load or pivot point, in essence, is on the head support device or spring and is transmitted therefrom onto the head, which arrangement inherently provides that gravitational forces on the mass weight of the head or air turbulence during initial positioning of the head or runout of the recording medium, easily facilitate the head assembly to rotate and strike the rotating surface.

Thus, the head support device 12 of the invention provides positive yet restrained gimbaled action herein as being rotation about a pivot point on the head assembly 10. Normally, the gimbaled action is about the pivot point formed by the plunger 76 so that as the pressure of the laminar air flow builds up, e.g., as the head is being moved into its flying position, the head assembly adjusts itself to a position parallel or essentially parallel with the recording surface.

While the principles of the invention have now been described with respect to a preferred embodiment, it will be clear that modifications could obviously be made in structure, arrangements, proportions and materials without departing from this invention. The appended claims are therefore intended to cover and embrace any such modifications that are within the true spirit of the invention.

What is claimed is:

1. In combination:

a transducer head constructed and arranged for flying on a fluid bearing in close proximity to a transducing surface;

gimbal supporting means to which said head is mounted for flyng so as to provide flexural freedom of rotation of said head around predetermined axes parallel to said surface while restraining rotation of said head about an axis perpendicular to said surface and also restraining motion of said head in a direction parallel to said surface; and head actuating means for applying a loading force to said head to urge said head toward said surface in a direction perpendicular thereto, said actuating means contacting said head in a plane which is coplanar with the center of mass of said head and parallel to said surface.

2. The invention in accordance with claim 1, wherein said gimbal means comprises a flat gimbal spring, and wherein said head includes mounting portions for mounting said head to said gimbal spring so that the plane of said gimbal spring passes through the center of mass of said head.

3. The invention in accordance with claim 1, wherein said actuating means comprises a plunger which is constructed and arranged to pass through an aperture in said head located so that said loading force is applied at approximately the center of mass of said head.

4. The invention in accordance with claim 3, wherein said gimbal means comprises an outer spring element and an inner spring element attached to said outer spring element at oppositely disposed locations along a first axis parallel to the relative direction of motion between said head and said surface, and wherein said inner spring element includes oppositely disposed inwardly extending projections located along a second axis perpendicular to said first axis for receiving the mounting portions of said head.

5. The invention in accordance with claim 4, wherein said outer and inner elements have a generally rectangular symmetrical configuration, wherein said inner and outer spring elements are attached at first oppositely disposed corners of said rectangular configuration, wherein said inwardly extending projections from said inner element project inwardly from second oppositely disposed corners of said rectangular configuration, and wherein said plunger is applied in a direction intersecting the geometrical center of said inner and outer elements.

6. The invention in accordance with claim 5, wherein said head contains oppositely disposed lateral ear portions extending therefrom and containing surfaces which are coplanar with said center of mass, and wherein said coplanar surfaces of said ear portions are attached to said inwardly extending projections.

7. The invention in accordance with claim 2, wherein said loading force is applied to said head along a line approximately intersecting the center of mass of said head and the geometric center of said gimbal spring.

* * * * *

UNITED STATES PATENT AND TRADEMARK OFFICE
CERTIFICATE OF CORRECTION

PATENT NO. : 4,058,843

DATED : November 15, 1977

INVENTOR(S) : Ko Ko Gyi

It is certified that error appears in the above-identified patent and that said Letters Patent are hereby corrected as shown below:

Col. 1, line 60, change "show" to --shoe--.
Col. 2, line 27, change "rigidly" to --rigidity--;
   line 34, between "of" and "spring" insert --the--.
Col. 5, line 67, change "elminates" to --eliminates--.
Col. 6, line 8, between "center" and "mass" insert --of--;
   line 30, change "or" to --of--;
   line 58, change "the", first occurrence, to --a--.
Col. 8, line 5, change "flyng" to --flying--.

Signed and Sealed this

Twenty-first Day of March 1978

[SEAL]

Attest:

RUTH C. MASON
Attesting Officer

LUTRELLE F. PARKER
Acting Commissioner of Patents and Trademarks